United States Patent Office 3,550,490
Patented Dec. 29, 1970

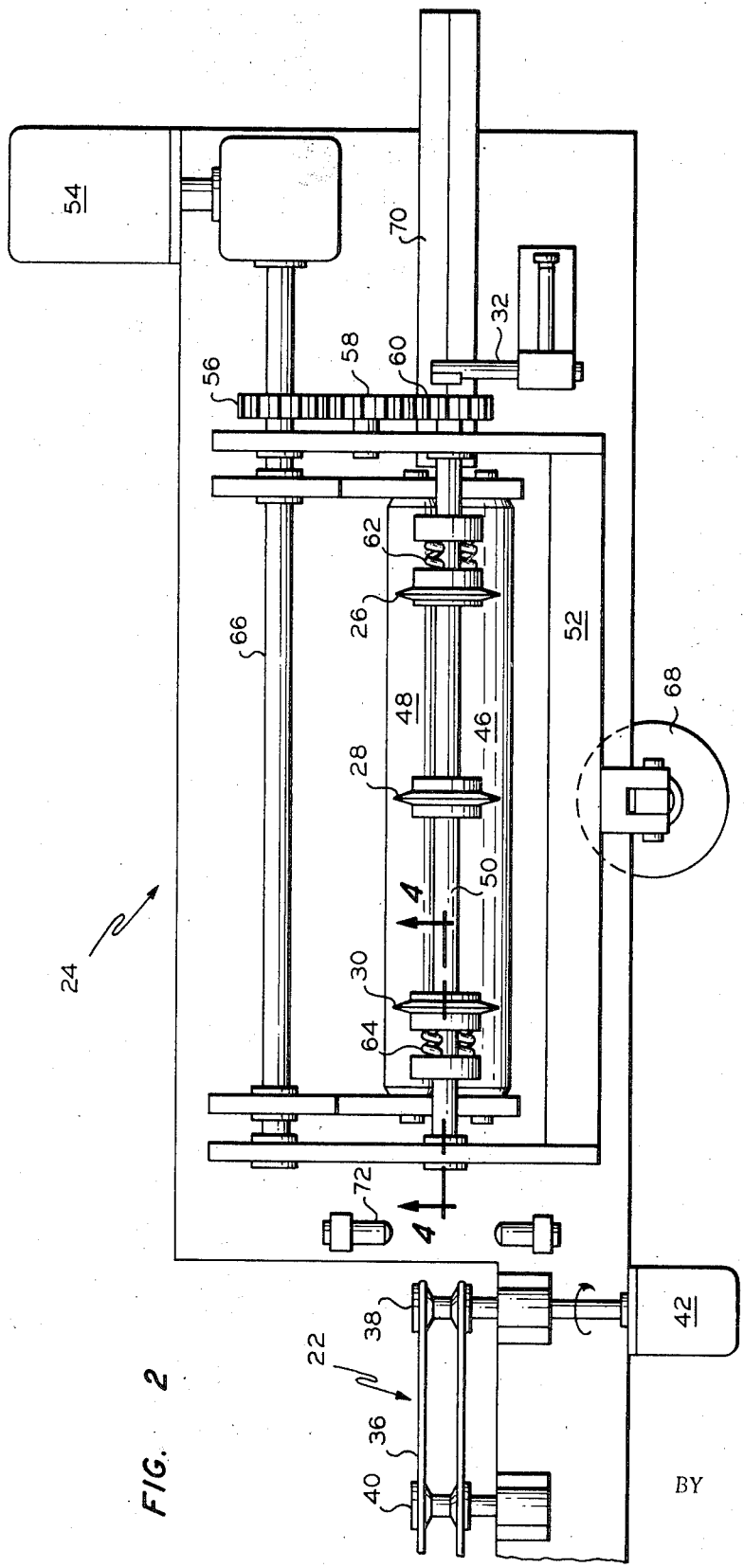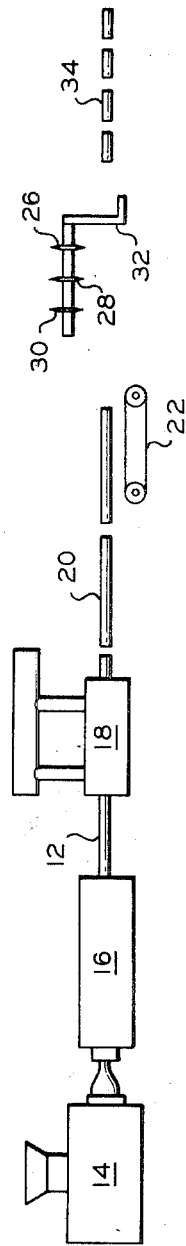

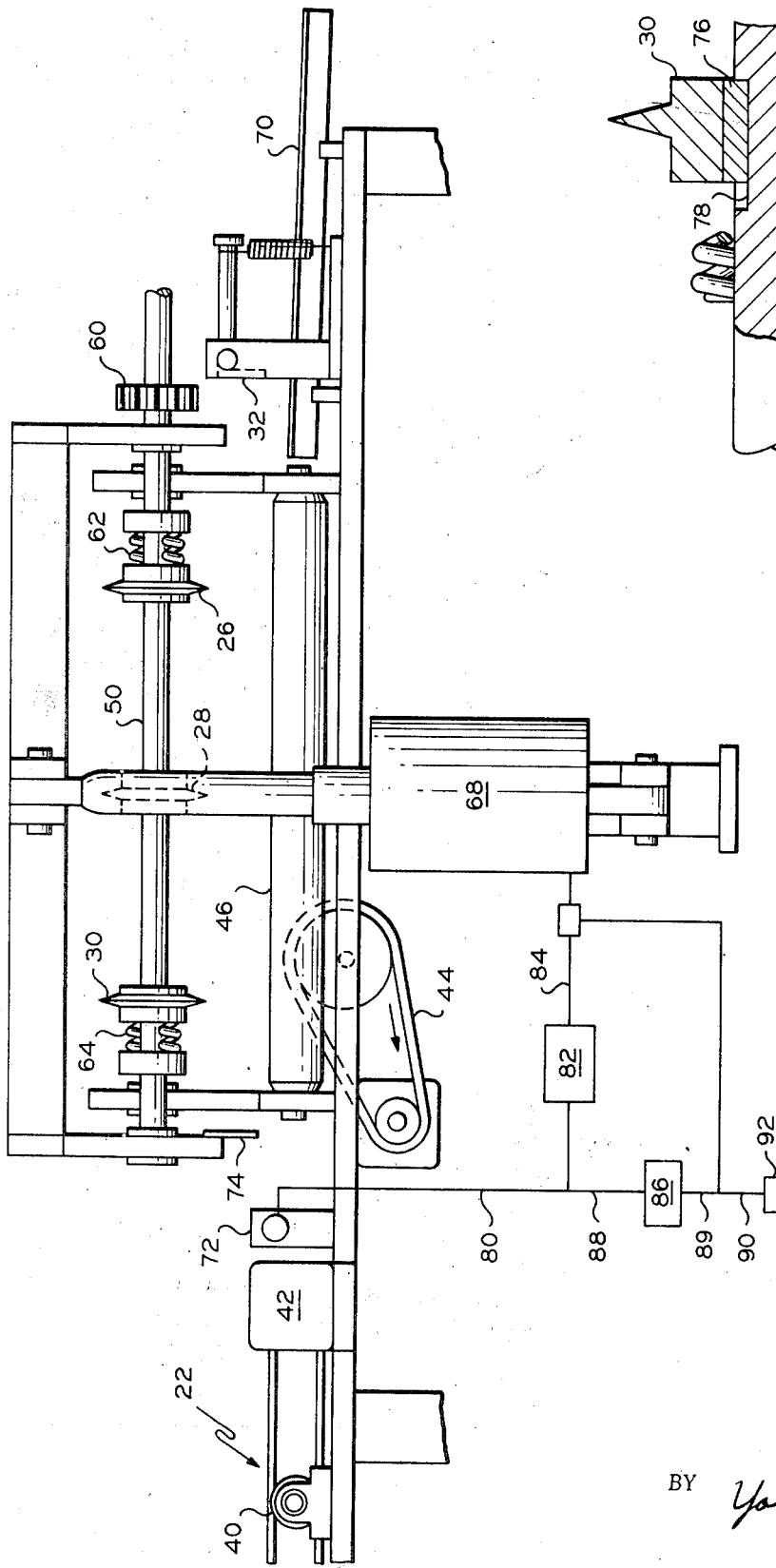

3,550,490
MULTIPLE CUTTING APPARATUS FOR ELONGATED ARTICLES
Joel T. Hicks, Little Rock, Ark., assignor to Phillips Petroleum Company, a corporation of Delaware
Filed June 10, 1968, Ser. No. 735,852
Int. Cl. B23b 7/00
U.S. Cl. 82—48                                        6 Claims

ABSTRACT OF THE DISCLOSURE

A length of an elongated article is cut into a plurality of shorter lengths by means of a plurality of cutting means which impinge upon the surface of said elongated article. The first of these cutting means is fixed to a rotating shaft. Spaced apart from the first cutting means is a second cutting means slidably keyed to the shaft and spring-biased toward the first cutting means. Additional cutting means slidably keyed to the shaft and biased toward the first cutting means can be provided. As the fixed cutting means is forced through the elongated article, the spring-biased cutting means slide axially to compensate for the wedging effect of the first cutting means. The cutting means is activated as a delayed response to a signal generated by passage of the elongated article by a sensing device so as to temporarily break a signal. Any equipment malfunction resulting in an extended break in the sensing signal allows a time delay relay means to time out and shut off the equipment.

BACKGROUND OF THE INVENTION

This invention relates to apparatus for cutting elongated articles. In another aspect it relates to a control means for article handling equipment.

In many instances it is desirable to cut an elongated work piece while the piece is moving on a production line. This allows a continuous operation without intermittent motion. This can be done by providing a slidable cutting means which moves along with the work piece; such a procedure is especially well suited for cutting continuously extruded thermoplastic pipe or tubing and the like into discrete lengths. However, since it requires a finite amount of time to make a cut, it is apparent that the concept of a moving cutter becomes less practical when it is desired to sever the elongated article into very short lengths.

SUMMARY OF THE INVENTION

It is an object of this invention to cut an elongated work piece into a provide for the cutting of a continuously extruded elongated article into small segments on a continuous basis. It is a further object of this invention to provide for cutting an elongated work piece into a plurality of lengths, each of which has a square cut. It is yet a further object of this invention to provide for cutting a discrete length of an elongated work piece into a plurality of smaller individual lengths without causing binding of the cutting means. It is yet a further object of this invention to provide a control system for article handling equipment.

In accordance with this invention, a first cutting means is fixedly attached to a rotating shaft, and a second cutting means, spaced apart from said first cutting means, is slidably keyed to said shaft and spring-biased toward said first cutting means.

BRIEF DESCRIPTION OF THE DRAWINGS

In the drawings, wherein like reference characters denote like parts in the various views, FIG. 1 is a schematic representation of an apparatus for continuously extruding and cutting an elongated article into a plurality of individual lengths.

FIG. 2 is a plan view of the stationary cutting mechanism of the instant invention.

FIG. 3 is a side view of the stationary cutting mechanism of the instant invention.

FIG. 4 is a cross section along section lines 4—4 of FIG. 2.

DESCRIPTION OF THE PREFERRED EMBODIMENTS

The instant invention is suitable for cutting any elongated article into a plurality of segments. It is particularly suitable for cutting hollow tubular thermoplastic material as it is extruded on a continuous basis in the form of pipe. The resulting short lengths of this pipe are then suitable for use as individual parisons for subsequent blow molding in the bottles and the like.

Referring now to FIG. 1, there is shown an entire extrusion and cutting apparatus in accordance with one embodiment of this invention. A continuous length 12 of thermoplastic tubing is continuously extruded from extruder 14 through cooling section 16. Moving cutter designated generally by reference character 18 cuts continuous length 12 into intermediate size elongated work pieces 20. Conveying means 22 picks up work piece 20 and advances said work piece forward at a speed considerably faster than the extrusion speed so as to position it within stationary cutting mechanism designated generally by reference character 24, this stationary cutting mechanism being shown schematically as three separate cutting blades, 26, 28, and 30, and a stop mechanism 32. Conveying means 22 is axially adjustable so as to accommodate varying length work pieces. Work piece 20 is cut into four individual parisons 34 in stationary cutting mechanism 24. These parisons 34 drop down after being cut so as to clear stop mechanism 32 and are advanced on to a receiving area by means not shown. Shortly after all of the parisons 34 have been removed from stationary cutting mechanism 24, another work piece 20 contacts conveying means 22 and is quickly moved into position in stationary cutting mechanism 24. The term "stationary" refers to the fact that the entire cutting mechanism 24 does no move axially with the elongated work piece as does cutting mechanism 18; the cutting blades, however, are adapted to reciprocate in a substantially vertical direction, and as will be described more fully hereinafter, certain of the cutting blades slide axially a small amount.

Referring now to FIG. 2, there is shown a plan view of the stationary cutting mechanism 24. Conveying means 22 for advancing work pieces 20 (FIG. 1) into the stationary cutting mechanism comprises two belts 36 mounted on pulleys 38 and 40. Pulley 40 is driven by motor 42 in the direction shown by the arrow. The work piece advanced by conveying means 22 is stopped by stop means 32. Stop means 32 is adjustable to accommodate different sized work pieces and is spring loaded so that in case of a jam of the work pieces it can swivel out of the way under excessive pressure. The work piece is biased against stop means 32 by belt 44 (see FIG. 3) which rotates in the direction shown by the arrow. Belt 44 is axially adjustable so as to enable it to contact the end of the work piece regardless of its length. Work piece 20 (FIG. 1) is supported in stationary cutting mechanism 24 (FIG. 1) by two cradle rollers, 46 and 48. Shaft 50 is supported on frame 52. Motor 54, acting through gears 56, 58, and 60, drives shaft 50. Circular, smooth-edged cutting blade 28 is fixedly attached to shaft 50, cutting blade 28 being hereinafter referred to as first cutting blade or means or fixedly attached cutting blade or means. Cutting blades 26 and 30 are slidably mounted on shaft 50 by means of splines or keys so that they may slide axially and at the same time are forced to rotate as shaft 50 rotates. Cutting blades 26 and/or 30 will hereinafter be referred to as second or slidably keyed as attached cutting means or blades. Cutting blades 26 and 30 are biased by means of springs 62 and 64, respectively, toward fixedly mounted cutting blade 28. Frame 52 pivots about shaft 66, thus causing shaft 50 to reciprocate intermittently in a substantially vertical direcion. As frame 52 is pivoted about shaft 66 so as to lower shaft 50 carrying the cutting blades, the rotating cutting blades will contact the peripheral surface of the tubular work piece 20 (FIG. 1) thus causing tubular work piece 20 (FIG. 1) to rotate which in turn causes rollers 46 and 48 which are freely pinned, to rotate. As the cutting blades are moved further downward to cut into the wall of tubular work piece 20, the wedging effect of fixedly attached tapered cutting blade 28 in work piece 20 causes the portions of work piece 20 on each side of cutting blade 28 to be moved slightly outward; cutting blades 26 and 30, being free to slide axially away from cutting blade 28, move with the work piece so as to enable the cut being made by blades 26 and 30 to be square, to prevent binding, and to insure that the length of the segment cut off between cutting blades 28 and 30, for instance, is exactly a length equal to the distance between the points where these blades first contacted the work piece.

Referring now to FIG. 3, there is shown a means in the form of air cylinder 68 for raising and lowering shaft 50 carrying the cutting blades. After the work piece is severed, individual parisons drop down clearing stop 32 and fall on trough 70 where they are conveyed to a receiving area. The first parison simply falls into the trough and the others are pushed into the trough by the next work piece. Article handling manipulations are controlled as follows. Air cylinder 68 is activated in response to a signal generated by photoelectric cell 72. Photocell 72 is axially adjustable so as to accommodate varying sized work pieces. As conveying means 22 conveys work piece 20 into position within stationary cutting mechanism 24, the passage of work piece 20 past photoelectric cell 72 causes a change in the signal generated by this cell. The control mechanism is set so that a predetermined number of seconds after this change in signal, which time is sufficient for the work piece 20 to come to rest against stop 32, air cylinder 68 is actuated to bring shaft 50 carrying cutting blades 26, 28, and 30 down against the work piece. Air cylinder 68 then raises shaft 50 carrying the cutting blades and the resulting parisons are transferred to the receiving station; this occurs in a sufficiently short time that cutting mechanism 24 is ready to receive another work piece by the time another work piece 20 which is moving at the speed of the extrusion operation has reached conveying mechanism 22. If stationary cutting mechanism 24 should jam in any way, thus preventing a work piece 20 from moving fully into position, this work piece would be left blocking permanently photoelectric cell 72. The control mechanism to which photoelectric cell 72 is connected is set so that if the cell is blocked for more than 10 seconds instead of just being momentarily interrupted, the power to stationary cutting mechanism 24 and/or air cylinder 68 is cut off, and an alarm sounds.

Referring now specifically to the control system, the signal from photoelectric cell 72 is fed via conduit 80 to time delay relay 82. After a preset time, time delay relay 82 activates air cylinder 68 by means of a signal transmitted via line 84. Signal from photoelectric cell 72 is also fed to timer relay 86 via line 88 which is connected with line 80. Each time the light to photoelectric cell 72 is broken, timer 86 is started. Timer 86 is set to time out in about 10 seconds. As soon as the work piece passes in front of photoelectric cell 72 and the light beam again contacts the photoelectric cell, timer 86 is reset. Should the system jam so that work piece 20 is in front of photoelectric cell 72 for more than the preset time, then timer relay 86 times out and generates a signal carried via line 89 to air cylinder 68 to shut down the operation. In addition, this signal carried via line 90 connected with line 89 is transmitted to an alarm 92 which activates the alarm. The control system can be reactivated by means at a reset button (not shown) when the obstruction is cleared.

A one-way clutch in the form of rubbery strip 74 prevents work piece 20 from bouncing backward excessively when it first hits stop 32. Belt 44, touching the bottom of work piece 20, keeps the work piece against the stop during the cutting operation. It is apparent that three separate gears could be used, one for each of the cutting means in place of a single gear 60, in order to more evenly distribute the wear on the gears.

While this invention is shown in the drawings as having a single fixed attached cutting blade and two spring-biased blades, it is apparent that it could have only one spring-biased cutting blade, or could have more than two spring-biased cutting blades. Also, blade 26 can be fixedly attached and both blades 28 and 30 spring biased toward blade 26.

Referring now to FIG. 4 there is shown one provision for slidably attaching cutting blade 30. As can be seen from this figure, cutting blade 30 is slidably attached to shaft 50 by means of pin 76 which slides in slot 78 in shaft 50. As can be seen in this figure blade 30 is biased by spring 64 and must turn along with shaft 50 as the result of being attached by means of key 76; however, it is free to slide axially to the right against the pressure exerted by spring 64.

While this invention has been described in terms of a machine disposed as shown in the drawings with shaft 50 reciprocating in a substantially vertical direction which is the preferred embodiment since this allows the use of gravity to cause the freshly cut-off parisons to fall down so as to clear the stop 32, the machine can be disposed at an angle if desired.

While this invention has been described in detail for the purpose of illustration, it is not to be construed as limited thereby but is intended to cover all changes and modifications within the spirit and scope thereof.

I claim:

1. An apparatus for cutting an elongated work piece into a plurality of sections comprising in combination:
   a frame;
   a shaft rotatably mounted on said frame for intermittent reciprocal movement;
   a drive means connected with said shaft to rotate said shaft about its longitudinal axis;
   a first cutting means fixedly attached to said shaft;
   a second cutting means slidably attached to said shaft, said second cutting means being spaced apart from said first cutting means and biased toward said first cutting means;
   a photoelectric cell;
   a light source;
   a time delay relay;
   a means for actuating said reciprocal movement of said shaft;
   first circuit means connecting said photoelectric cell and said time delay relay for carrying a signal generated by temporary blockage of the light to said photoelectric cell;
   second circuit means connecting said time delay relay and said means for actuating said intermittent reciprocal movement of said shaft for transmitting a signal from said time delay relay to said means for actuating said reciprocal movement of said shaft for the purpose of initiating said actuation;
   a timer relay;
   a third circuit means connecting said first circuit means with said timer relay for carrying a signal from said photoelectric cell to start a timer in response to an interruption in said light beam and to reset said timer in response to the light beam being restored; and fourth circuit means for conveying a signal, in response to said timer timing out, from said timer relay to said means for actuating said intermittent reciprocal movement to shut off said means.

2. An apparatus according to claim 1 comprising in addition:

a third cutting means slidably attached to said shaft, said third cutting means spaced apart from said first cutting means such that said first cutting means is between said second and third cutting means, said third cutting means being biased toward said first cutting means.

3. An apparatus according to claim 1 wherein said second cutting means is biased by means of a spring.

4. Apparatus according to claim 1 comprising in addition:

two cradle rollers pinned so as to freely rotatable and disposed in a side by side arrangement parallel to said drive shaft and at a point substantially below said drive shaft to serve as a support means for said elongated work piece during the cutting operation.

5. Apparatus according to claim 1 wherein said cutting means are in the form of circular smooth-edged tapered cutting blades.

6. Apparatus according to claim 1 comprising in addition:

means to advance said elongated work piece axially into position under said cutting means;

stop means for limiting the forward axial movement of said elongated work piece; and means to maintain said elongated work piece biased against said stop means during the cutting operation.

References Cited

UNITED STATES PATENTS

| | | | |
|---|---|---|---|
| 2,619,176 | 1952 | Pearson | 82—101X |
| 3,094,026 | 1963 | Pottle | 82—87X |
| 3,149,520 | 1964 | Fish et al. | 83—370X |
| 3,270,599 | 1966 | Kleist | 83—63 |

ANDREW R. JUHASZ, Primary Examiner

J. F. COAN, Assistant Examiner

U.S. Cl. X.R.

82—87, 89, 101; 83—63, 365, 370